United States Patent Office 3,494,885
Patented Feb. 10, 1970

3,494,885
POLYCARBONATE AND POLYESTER COMPOSITIONS STABILIZED WITH SUBSTITUTED PHENOTHIAZINES
John W. Thompson and Winston J. Jackson, Jr., Kingsport, Tenn., assignors to Eastman Kodak Company, Rochester, N.Y., a corporation of New Jersey
No Drawing. Filed Dec. 18, 1967, Ser. No. 691,156
Int. Cl. C08g 51/60
U.S. Cl. 260—45.8                          17 Claims

ABSTRACT OF THE DISCLOSURE

Polycarbonates and polyesters derived from aromatic dihydroxy compounds which are stabilized against oxidative deterioration at elevated temperatures with substituted phenothiazines.

---

This invention relates to polymeric materials useful for high temperature applications. More particularly, this invention relates to the stabilization of polycarbonate and polyester polymers derived from aromatic dihydroxy compounds.

The use of polymeric materials for high temperature applications of the order of 150° C.–250° C. has received increased interest as a result of various economic factors. Such applications include electrical insulation for numerous purposes as in motors, generators and transformers, motion picture film base for projection with high wattage lamps, fibers for fabrication into temperature resistant fabrics, and various parts formed by casting or extrusion for use in applications involving exposure to elevated temperatures.

It is known that many polycarbonate and polyester polymers derived from aromatic dihydroxy compounds have good heat distortion properties. For this reason these polymers would be desirable for high temperature applications provided, of course, that they also are or can be made oxidatively stable at such temperatures.

Generally, it has been common practice to add antioxidants to polymers to improve their oxidative stability. Of course, due to the empirical nature of the antioxidant art the useful antioxidants will vary from polymer to polymer. That is, an antioxidant which may be effective for one specific polymer may be essentially ineffective for another specific polymer.

Several antioxidants are known and available which provide avrious polymers with adequate oxidative stability at moderate temperatures. Examples of such stabilizers include N,N' - diphenyl - p - phenylenediamine, N-phenyl-1 - naphthalamine, dilauryl thiodipropionate, 4,4'-thiobis (6-t.-butyl-m-cresol), and phenothiazine. However, these antioxidants are generally considered to be inadequate for the high temperatures at which it is desirable to employ polycarbonate and polyester polymers derived from aromatic dihydroxy compounds. In particular, the above antioxidants are inadequate in either inhibiting degradation of strength properties or inhibiting discoloration of the polymers when subjected to high temperatures.

Therefore, it is an object of this invention to provide stabilized compositions of polycarbonate and polyester polymers derived from aromatic dihydroxy compounds which have enhanced oxidative stability at high temperatures. This, as well as other objects of the invention, will be apparent from the following detailed description.

Briefly, in accordance with this invention, it has been found that polycarbonate and polyester polymers derived from aromatic dihydroxy compounds may be effectively stabilized against oxidation at high temperatures by incorporating therein a stabilizing amount of at least one substituted phenothiazine having the following formula:

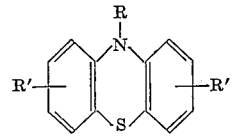

wherein R is hydrogen, a straight or branched chain alkyl radical haivng 1 to 30 carbon atoms (preferably 1 to 18 carbon atoms), or an alkylthioalkyl radical wherein the total carbon atom content is from 2 to 18; each R' independently is hydrogen, a straight or branched chain alkyl radical having 1 to 30 carbon atoms (preferably 4 to 18 carbon atoms), a —NHX radical wherein X can be $C_1$–$C_{18}$ alkyl, phenyl or substituted phenyl, a —SY radical wherein Y is an alkyl radical having 1 to 18 carbon atoms, or an alkylthioalkyl radical wherein the total carbon atom content is from 2 to 18; and at least one R or R' is other than hydrogen.

Some examples of suitable alkyl radicals include methyl, ethyl, isobutyl, heptyl, octyl, decyl, dodecyl, 1-methylpentadecyl, 1-methylheptadecyl, octadecyl, and the like.

Suitable alkylthioalkyl radicals include methylthiomethyl, methylthiopropyl, ethylthiobutyl, octylthiodecyl, pentylthiopropyl, and the like. Other radicals of this type will be apparent to those skilled in the art.

Those —NHX radicals which may be present include methylamino, ethylamino, hexylamino, dodecylamino, phenylamino, 2 - methylphenylamino, 2,3 - dimethylphenylamino, 4 - hydroxyphenylamino, and the like.

The —SY radical may include thiomethyl, thiobutyl, thiooctyl, thiododecyl, and the like.

While the invention broadly includes compounds having R' groups at random positions on each side of the molecule it is preferred that the R' groups be in the 3,7 position.

A particularly effective group includes the alkyl-substituted phenothiazines having the following general formula:

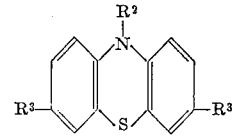

wherein $R^2$ is hydrogen or a branched or straight chain alkyl radical having 1 to 18 carbon atoms; each $R^3$ independently is hydrogen or a branched or straight chain alkyl radical having 4 to 18 carbon atoms; and at least one $R^2$ or $R^3$ is other than hydrogen.

Some examples of these alkyl-substituted phenothiazines are as follows:

N-methyl-phenothiazine
N-ethyl-phenothiazine
N-t.-butyl-phenothiazine
N-(1-methylheptyl)-phenothiazine
N-dodecyl-phenothiazine
N-(1-methylheptadecyl)-phenothiazine
N-octyldecyl-phenothiazine
1-butyl-phenothiazine
1-butyl-9-octyl-phenothiazine
1-butyl-7-dodecyl-phenothiazine
2-octyl-phenothiazine
2-heptadecyl-6-butyl-phenothiazine
2-t.-butyl-8-octyl-phenothiazine
7-octyl-phenothiazine
3-hexyl-7-heptyl-phenothiazine 9-butyl-phenothiazine
3-(1-methylheptadecyl)-9-butyl-phenothiazine
8-octyl-phenothiazine
2-pentyl-7-(1-methylpentyl)-phenothiazine
2,8-dibutyl-phenothiazine
3,7-di(1,1,3,3-tetramethylbutyl)-phenothiazine
3,7-didodecyl-phenothiazine
3,7-dioctyl-phenothiazine
3,7-di(t. butyl)-phenothiazine
N-ethyl-3,7-di(1,1,3,3-tetramethylbutyl)-phenothiazine
N-dodecyl-3,7-di(octyl)-phenothiazine
N-octyldecyl-3,7-di(1-methylpentyl)-phenothiazine
N-dodecyl-3,7-di(1,1,3,3-tetramethylbutyl)-phenothiazine
N-t. butyl-2-butyl-7-octyl-phenothiazine
N-octyl-2-butyl-8-dodecyl-phenothiazine
N-decyl-1,9-dibutyl-phenothiazine Preparation of the above substituted phenothiazines may generally be accomplished in one or two steps depending on whether or not a substituent is desired in the N-position. Where no substituent in the N-position is desired the preparation merely involves reacting the corresponding substituted diphenylamine with sulfur. When a substituent is desired in the N-position the product obtained from the above reaction is further reacted with a trisubstituted phosphate, in the case of an alkyl substituent a trialkyl phosphate may be used. Another method for obtaining a substituent in the N-position is by reacting the sodium derivative of the phenothiazine compound obtained in the above reaction with the corresponding halogenated substituent, such as an alkyl halide.

The following examples will serve to further describe the preparation of these compounds.

EXAMPLE 1

Sulfur is reacted with 4,4'-bis(1,1,3,3-tetramethylbutyl(diphenylamine to yield 3,7-bis(1,1,3,3-tetramethylbutyl)phenothiazine. This produce is thereafter reacted with triethyl phosphate to give N-ethyl-3,7-bis(1,1,3,3-tetramethylbutyl) phenothiazine having a melting point in the range of 103–104.5° C.

EXAMPLE 2

The sodium derivative of 3,7-bis(1,1,3,3-tetramethylbutyl)phenothiazine is reacted with dodecyl bromide to yield N-dodecyl-3,7-bis(1,1,3,3 - tetramethylbutyl)phenothiazine having a melting point in the range of 45–47° C.

Any polycarbonate or polyester derived from difunctional aromatic dihydroxy compounds can be effectively stabilized with the above-described substituted phenothiazines. Polycarbonates and polyesters of this type may be prepared in accordance with conventional techniques such as described in Condensation Polymers (Interscience), 1965, by Paul W. Morgan.

The difunctional aromatic dihydroxy compounds from which these polycarbonates and polyesters are derived include those compounds wherein the hydroxy substituents are attached directly to the aromatic ring as well as indirectly, such as through an alkylene group or the like. Some examples of suitable aromatic dihydroxy compounds are as follows: 4,4'-thiodiphenol; 4,4'-methylenediphenol; 4,4'-dihydroxybiphenyl; o-, m-, and p-dihydroxybenzenes; 4,4'-sulfonyldiphenol; 4,4'-oxydiphenol; 4,4'-isopropylidenediphenol; 4,4' - isopropylidenebis(2,6-dichlorophenol); 4,4' - isopropylidenebis(2,6 - dibromophenol); 4,4'-cyclohexylidenediphenol; 4,4'-cyclohexylmethylenediphenol; 4,4' - (2-norbornylidene)diphenol; 4,4'-(2-norbornylidene)bis(2,6-dichlorophenol); 4,4'-(2-norbornylmethylene)diphenol; o-, m- and p-xylylene diol; 2,5-naphthalene diol; 2,5-norbornane diol; and 4,4'-(hexahydro-4,7-methanoindan-5-ylidene)diphenol. Other aromatic dihydroxy compounds which can also be used will be apparent to those skilled in the art.

In preparing polycarbonates from the above-described difunctional aromatic dihydroxy compounds, carbonic acid or derivatives thereof are used. Examples of suitable derivatives of carbonic acid include phosgene, bromophosgene, diethyl carbonate, dibutyl carbonate, and diphenyl carbonate. The term "carbonic acid" is to be understood to include derivatives thereof.

In preparing polyesters from the previously described aromatic dihydroxy compounds, difunctional dicarboxylic acids are used. Examples of suitable acids include oxalic; malonic; dimethylmalonic; succinic; glutaric; adipic; 3-methyl adipic; trimethyl adipic; pimelic; 2,2-dimethylglutaric; 3,3-diethylsuccinic; azelaic; sebacic; suberic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic; 1,4 - cyclohexenedicarboxylic; phthalic; terephthalic; isophthalic; 4-methylisophthalic; t-butyl isophthalic; 2,5-norbornanedicarboxylic; 2,5-norbornenedicarboxylic; 1,4-naphthalic; diphenic; 4,4'-oxydibenzoic; 4,4'-methylenedibenzoic; diglycolic; thiodipropionic; 4,4'- sulfonyldibenzoic; 2,5-naphthalene dicarboxylic; 2,6-naphthalene dicarboxylic; and 2,7-naphthalene dicarboxylic acids. It will be understood that the corresponding acid anhydrides, esters, and acid chlorides of these acids are included in the term "dicarboxylic acid." Preferred among these derivatives are the esters, examples of which include diphenyl 1,4-cyclohexanedicarboxylate; diphenyl, 2,6-naphthalenedicarboxylate; diphenyl 4,4'-sulfonyldibenzoate; diphenyl isophthalate; dicresyl terephthalate; and diphenyl terephthalate.

It will be understood that the terms "polycarbonate" and "polyester" as used herein include copolycarbonates, copolyesters, and copoly(ester-carbonates). These polymers may be prepared using two or more aromatic dihydroxy compounds and/or two or more acid reactants.

Further examples of polycarbonates and polyesters derived from aromatic dihydroxy compounds may be found in U.S. 2,964,797 to Peilstocker et al., U.S. 3,028,365 to Schnell et al., U.S. 3,299,000 to Jackson et al., U.S. 3,317,466 to Caldwell et al., Ind. Eng. Chem., 51, 147 (1959), J. Polymer Sci., 40, 249 (1959), and J. Polymer Sci., 40, 399 (1959).

The substituted phenothiazine antioxidants may be incorporated into the above-described polycarbonates and polyesters in a conventional manner either as is or as concentrates or in solvent solutions. Such conventional techniques include milling on heated rolls, melt blending, or blending the powdered ingredients. A stabilizing amount of the antioxidant is employed and may vary depending on the specific antioxidant compound and polymer employed as well as the ultimate use of the stabilized resin. Generally, an amount in the range of about 0.05–5.0% by weight based on the polymer may be used, although 0.25–2.0% by weight based on the polymer is effective for most applications.

Other additives may also be incorporated into the polymer, either before, during, or after the incorporation of the antioxidant. These additives include various fillers, pigments, UV inhibitors, antistatic agents, physical or electrical property improvers, dyes, fire retardants, and the like.

The following examples will serve to further illustrate the invention.

EXAMPLE 3

In preparing a sample control film of stability tests at elevated temperatures 2.0 g. 4,4'-(2-norbornylidene)diphenol polycarbonate polymer, having an initial inherent viscosity of 1.16 as measured in chloroform at 0.23 g./100 ml., is dissolved in 10 ml. of chloroform to form a dope. A 2-mil film is cast from this dope on a glass plate at room temperature using a doctor blade. After drying for about one hour the film is removed from the plate and dried further at 110° C. for 2 hours to remove the solvent.

EXAMPLES 4–11

Additional test sample films of 4,4'-(2-norbornylidene) diphenol polycarbonate containing 1.0% by weight, based on the polymer, of the following antioxidants are prepared in the same manner as described in Example 3 with the antioxidant in each case being dissolved in the chloroform along with the polymer.

TABLE I

| Example Number | Antioxidant |
|---|---|
| 4 | N,N'-diphenyl-p-phenylenediamine. |
| 5 | Dilauryl-thiodipropionate. |
| 6 | 4,4'-methylene bis (2,6-di-tert.-butylphenol). |
| 7 | Phenothiazine. |
| 8 | N-ethyl phenothiazine. |
| 9 | 3,7-bis(1,1,3,3-tetramethylbutyl)phenothiazine. |
| 10 | N-ethyl-3,7-bis(1,1,3,3-tetramethylbutyl)phenothiazine. |
| 11 | N-dodecyl-3,7-bis(1,1,3,3-tetramethylbutyl)phenothiazine. |

EXAMPLE 12

The sample films prepared as described in Examples 3–11 are tested for stability at elevated temperatures by suspending them in a forced air oven maintained at 200° C. and periodically examining them according to the following criteria. The criteria for determining relative stability of each sample film includes (1) the number of hours for the film to become insoluble in boiling chloroform, (2) the number of hours for the film to become brittle upon flexing 180° at room temperature, and (3) the number of hours for color development of an arbitrary brown color designated as 4, using a scale of 0 (colorless) to 10 (dark brown) based on preaged samples. The results of these tests are set forth in Table II.

TABLE II

| | Film Life at 200° C., Hours to— | | |
|---|---|---|---|
| Film of Example No. | Brittleness | Insolubility | 4-Color |
| 3 | 120 | 72 | 72 |
| 4 | 138 | 81 | <66 |
| 5 | 120 | 72 | 72 |
| 6 | 156 | 96 | 48 |
| 7 | 192 | 120 | <48 |
| 8 | 216 | 144 | 96 |
| 9 | 168 | 120 | 120 |
| 10 | 312 | 216 | 264 |
| 11 | 216 | 168 | 160 |

The results of the above tests demonstrate that the alkyl-substituted phenothiazines (Examples 8–11) provide superior film life for all three stabilization criteria whereas the conventional antioxidants (Examples 4–7) are deficient in one or more of the three criteria.

EXAMPLE 13

Using the film casting method described in Example 3, several films are formed from 4,4'-(2-norbornylidene)diphenol polycarbonate containing N-ethyl-3,7-bis(1,1,3,3-tetramethylbutyl)phenothiazine in concentrations varying from 0.1–2.0% by weight based on the polymer. The films cast vary in thickness from 0.25–2.0 mils and are oven tested at 175° C. and 200° C. in accordance with the procedures and criteria set forth in Example 12. The results of these tests are tabulated in Table III.

The results of these tests demonstrate the effectiveness of the alkyl-substituted phenothiazines in the subject polymers at elevated temperatures over a broad range of conditions.

EXAMPLE 14

Two sample films (2-mils in thickness) of a commercial polycarbonate, Bisphenol A polycarbonate (Lexan–125), are prepared, one of which contains no antioxidant and the other containing 1.0% by weight based on the polymer of N-ethyl-3,7-bis(1,1,3,3-tetramethylbutyl)phenothiazine. These sample films are then exposed to air in an oven maintained at 150° C. After 105 days the stabilized film still appeared relatively intact while the unstabilized film was almost disintegrated. Moreover, the stabilized film was still soluble in chloroform while the unstabilized film was insoluble.

EXAMPLE 15

Using a similar procedure as described in Example 14, two sample 1-mil films of a polycarbonate of 4,4'-hexahydro-4,7-methanoindan-5-ylidene)diphenol and (I.V. of 0.92 in chloroform) are prepared, one containing no antioxidant and the other having 1.0% by weight based on the polymer of N-ethyl-3,7-bis(1,1,3,3-tetramethylbutyl)phenothiazine. The films are oven tested at 200° C. The unstabilized film had an oven life of 120 hours to brittleness, in contrast to a life of 250 hours for the stabilized film.

EXAMPLE 16

A polyester is prepared from reaction of a 50/50 molar mixture of terephthalic and isophthalic acids with 4,4'-(2-norbornylidene)diphenol diacetate. This polyester has a melting point of >300° C. and an inherent viscosity (in chloroform) of 0.76. Employing dopes of 2.0 g. polyester and 12 ml. chloroform, 2-mil films are cast without and with 1.0% by weight based on the polymer of N-ethyl-3,7-bis(1,1,3,3-tetramethylbutyl)phenothiazine. The results of oven exposure tests at 200° C. are shown in Table IV.

TABLE IV

| | Film Life at 200° C., Hours to— | | |
|---|---|---|---|
| Antioxidant (1.0 wt. percent) | Brittleness | Insolubility | 4-Color |
| None (control) | 192 | 120 | 96 |
| N-ethyl-3,7-bis(1,3,3,3-tetramethylbutyl)phenothiazine | 336 | 240 | 168 |

The results show the protection afforded to the polyester for all three stabilization criteria.

EXAMPLE 17

In accordance with the procedure set forth in Example 16, tests are performed with a polyester prepared from Bisphenol A and a 30/70 molar mixture of terephthalic and isophthalic esters (I.V. of 0.64) using 1.0% by weight

TABLE III

| Film Thickness, Mils | Wt. percent Antioxidant in Polycarbonate Film | Oven Life at 175° C., Hours to— | | | Oven Life at 200° C., Hours to— | | |
|---|---|---|---|---|---|---|---|
| | | Brittle. | Insol. | 4-Color | Brittle. | Insol. | 4-Color |
| 0.25 | None (control) | 1,176 | 504 | 1,008 | 192 | 72 | 144 |
| 0.25 | 0.50 | 2,352 | 1,008 | 1,848 | 320 | 240 | 288 |
| 0.25 | 1.0 | 2,688 | 1,176 | 2,016 | 360 | 240 | 340 |
| 1.0 | None (control) | 1,008 | 504 | 768 | 144 | 72 | 108 |
| 1.0 | 0.50 | 2,016 | 1,176 | 1,680 | 288 | 216 | 264 |
| 1.0 | 1.0 | 3,024 | 1,008 | 2,016 | 320 | 240 | 212 |
| 2.0 | None (control) | 1,008 | 504 | 720 | 120 | 72 | 72 |
| 2.0 | 0.10 | | | | 192 | 96 | 120 |
| 2.0 | 0.25 | | | | 216 | 98 | 180 |
| 2.0 | 0.50 | 2,184 | 1,512 | 1,680 | 264 | 216 | 228 |
| 2.0 | 1.0 | | | | 312 | 216 | 264 |
| 2.0 | 2.0 | 2,688 | 1,392 | | 240 | 216 | 96 | based on the polymer of N-ethyl-3,7-bis(1,1,3,3-tetramethylbutyl)phenothiazine as the antioxidant. The results of oven exposure tests at 200° C. are shown in Table V.

TABLE V

| Antioxidant (1.0 wt. percent) | Film Life at 200° C., Hours to Brittleness |
|---|---|
| None (control) | 235 |
| N-ethyl-3,7-bis(1,1,3,3-tetramethylbutyl)phenothiazine | 425 |

Similar results may also be achieved with a polyester derived from Bisphenol A and a 50/50 molar mixture of terephthalic and isophthalic esters.

EXAMPLE 18

Using the procedures set forth hereinabove, test sample films of 4,4'-(2-norbornylidene)diphenol polycarbonate are found to be effectively stabilized when containing, respectively, 1.0% by weight of N-ethyl-3,7-di-tert.-butylphenothiazine and 2.0% by eight of N-ethyl-3,7-didodecylphenothiazine.

Based on the above examples it may be seen that the N-3,7-alkyl substituted phenothiazines provide the most superior stabilizing results of the alkyl-substituted phenothiazines disclosed herein.

It is also pointed out that the substituted phenothiazines appear to exert their antioxidant effect primarily at elevated temperatures when incorporated in the subject polycarbonates and polyesters derived from aromatic dihydroxy compounds. In this respect it is emphasized that in spite of the above unique effect the compounds are still effective antioxidants at lower temperatures.

The stabilized thermopalstic compositions of this invention may be formed, by extrusion or molding, into films, fibers, sheets, tubes, rods, parts for electrical and mechanical equipment which may be subjected to elevated temperatures.

Thus, having described the invention in detail, it will be understood that certain variations and modifications may be effected without departing from the spirit and scope of the invention as disclosed herein and defined in the appended claims.

We claim:
1. A thermoplastic composition stabilized against oxidative degradation at elevated temperatures comprising:
  (A) at least one thermoplastic polymer selected from the group consisting of (1) polycarbonates derived from the difunctional aromatic dihydroxy compounds and carbonic acid and (2) polyesters derived from difunctional aromatic dihydroxy compounds and difunctional dicarboxylic acids, and
  (B) a stabilizing amount of at least one alkyl-substituted phenothiazine having the following formula

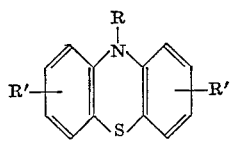

wherein R s hydrogen, a straight or branched chain alkyl radical having 1 to 30 carbon atoms, or an alkylthioalkyl radical wherein the total carbon atom content is from 2 to 18; and at least one R or R' is drogen, a straight or branched chain alkyl radical having 1 to 30 carbon atoms, an —SY radical wherein Y is an alkyl radical having 1 to 18 carbon atoms, or an alkylthioalkyl radical wherein the total carbon atom content is from 2 to 18, and at least one R or R' is other than hydrogen.

2. A thermoplastic composition according to claim 1 wherein the thermoplastic polymer is the polycarbonate of 4,4'-(2-norbornylidene)diphenol and the alkyl-substituted phenothiazine is an N-3,7-trialkyl-phenothiazine.

3. A thermoplastic composition according to claim 1 wherein the thermoplastic polymer is the polycarbonate of 4,4'-isopropylidene diphenol and the alkyl-substituted phenothiazine is an N-3,7-trialkyl-phenothiazine.

4. A thermoplastic composition according to claim 1 wherein the thermoplastic polymer is the polycarbonate of 4,4'- hexahydro-4,7-methanoindan-5-ylidene)diphenol and the alkyl-substituted phenothiazine is an N-3,7-trialkyl-phenothiazine.

5. A thermoplastic composition according to claim 1 wherein the thermoplastic polymer is the polyester of 4,4'-isopropylidene diphenol and mixed isophthalic and terephthalic acids and the alkyl-substituted phenothiazine is an N-3,7-trialkyl-phenothiazine.

6. A thermoplastic composition according to claim 1 wherein the thermoplastic polymer is the polyester of 4,4'-(2-norbornylidene)diphenol and mixed terephthalic and isophthalic acids and the alkyl-substituted phenothiazine is an N-3,7-trialkyl-phenothiazine.

7. A thermoplastic composition stabilized against oxidative degradation at elevated temperatures comprising:
  (A) at least one thermoplastic polymer selected from the group consisting of (1) polycarbonates derived from difunctional aromatic dihydroxy compounds and carbonic acid and (2) polyesters derived from difunctional aromatic dihydroxy compounds and difunctional dicarboxylic acids, and
  (B) a stabilizing amount of at least one alkyl-substituted phenothiazine having the following formula

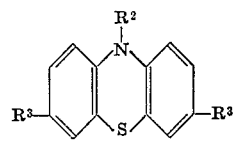

wherein $R^2$ is hydrogen or a branched or straight chain alkyl radical having 1 to 18 carbon atoms, each $R^3$ independently is hydrogen or a branched or straight chain alkyl radical having 4 to 18 carbon atoms, and at least one $R^2$ or $R^3$ is other than hydrogen.

8. A thermoplastic composition according to claim 7 wherein the thermoplastic polymer is the polycarbonate of 4,4'-(2-norbornylidene)diphenol.

9. A thermoplastic composition according to claim 7 wherein the thermoplastic polymer is the polycarbonate of 4,4'-isopropylidene diphenol.

10. A thermoplastic composition according to claim 7 wherein the thermoplastic polymer is the polycarbonate of 4,4'-(hexahydro-4,7-methanoindan-5-ylidene) diphenol.

11. A thermoplastic composition according to claim 7 wherein the thermoplastic polymer is the polymer of 4,4'-isopropylidene diphenol and mixed isophthalic and terephthalic acids.

12. A thermoplastic composition according to claim 7 wherein the thermoplastic polymer is the polyester of 4,4'-(2-norbornylidene) diphenol and mixed terephthalic and isophthalic acids.

13. A thermoplastic composition according to claim 7 wherein $R^2$ and each $R^3$ are alkyl radicals as defined therein.

14. A thermoplastic composition according to claim 7 wherein each $R^3$ is a 1,1,3,3-tetramethylbutyl radical.

15. A thermoplastic composition according to claim 14 wherein $R^2$ is an ethyl radical.

16. A thermoplastic composition according to claim 14 wherein $R^2$ is a dodecyl radical.

17. Shaped articles formed from the composition of claim 7.

References Cited

UNITED STATES PATENTS

| | | | | |
|---|---|---|---|---|
| 2,998,405 | 8/1961 | Weldy | | 260—45.8 |
| 3,014,888 | 12/1961 | Shimmin et al. | | 260—45.8 |
| 3,097,100 | 7/1963 | Lappin et al. | | 106—176 |
| 3,364,170 | 1/1968 | Savides | | 260—45.8 |
| 3,389,124 | 6/1968 | Sparks | | 252—51.5 |

DONALD E. CZAJA, Primary Examiner

R. A. WHITE, Assistant Examiner

U.S. Cl. X.R.

260—45.85, 45.9, 45.95

PO-1050
(5/69)

UNITED STATES PATENT OFFICE
CERTIFICATE OF CORRECTION

Patent No. 3,494,885    Dated February 10, 1970

Inventor(s) John W. Thompson and Winston J. Jackson, Jr.

It is certified that error appears in the above-identified patent and that said Letters Patent are hereby corrected as shown below:

Column 1, line 50, "avrious" should be ---various---;
Column 3, line 37, "butyl(diphenylamine" should read
---butyl)diphenylamine---; Column 3, line 38, "produce"
should read ---product---; Column 4, lines 38, 39 and 40,
Volume Nos. "51", "40" and "40" should be underlined, i.e.,
51, 40, 40; Column 5, line 41, in Table II, under the heading
"Film of Example No.", add the number ---11---; Column 7,
line 37, "thermopalstic" should read ---thermoplastic---;
Column 7, line 68, "s" should read ---is---; Column 7, lines
71 and 72 should read ---content is from 2 to 18; each R'
independently is hydrogen, a straight or branched chain alkyl
radical hav----; Column 8, line 64 should read ---wherein
the thermoplastic polymer is the polyester of---.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents